(No Model.)

J. F. TAYLOR.
STEAMING KETTLE.

No. 481,982. Patented Sept. 6, 1892.

Witnesses
John Buckler,
L. H. Osgood

Inventor
James F. Taylor,
By his Attorney
Worth Osgood

THE NORRIS PETERS CO., PHOTO-LITHO., WASHINGTON, D. C.

UNITED STATES PATENT OFFICE.

JAMES F. TAYLOR, OF BROOKLYN, NEW YORK.

STEAMING-KETTLE.

SPECIFICATION forming part of Letters Patent No. 481,982, dated September 6, 1892.

Application filed October 16, 1891. Serial No. 408,860. (No model.)

*To all whom it may concern:*

Be it known that I, JAMES F. TAYLOR, of Brooklyn, county of Kings, and State of New York, have invented certain new and useful Improvements in Steaming-Kettles, of which the following is a full, clear, and exact description, reference being had to the accompanying drawings, and to the letters of reference marked thereon.

My invention has relation to that class of devices commonly known as "steaming-kettles," wherein heat is conveyed to an inner vessel by steam converted from water contained in an outer vessel or jacket, the latter being alone exposed to the direct action of the fire.

The object of my invention is to provide a simple, cheap, and efficient means for readily regulating the temperature of the inner vessel, which means shall add very little, if anything, to the cost of construction, be always ready for use, and in no way liable to get out of order.

To attain this object and to secure other advantages in the matters of construction, operation, and use, my improvements involve certain novel and useful particulars of invention, as will be herein first fully described, and then pointed out in the claim.

Figure 1:
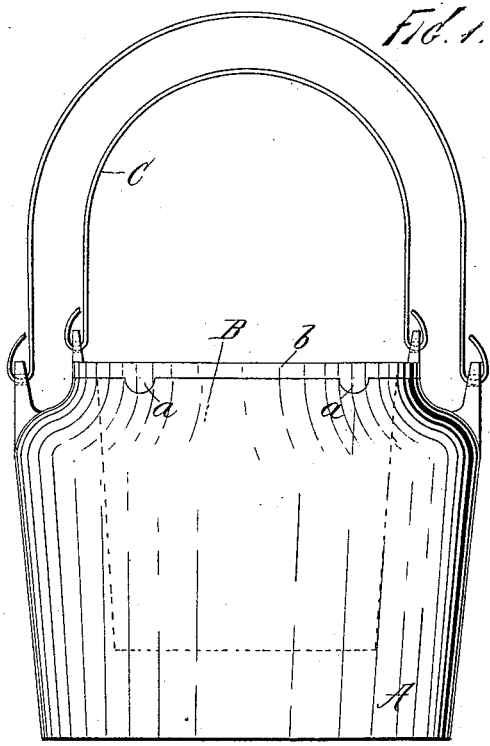
Figure 2:
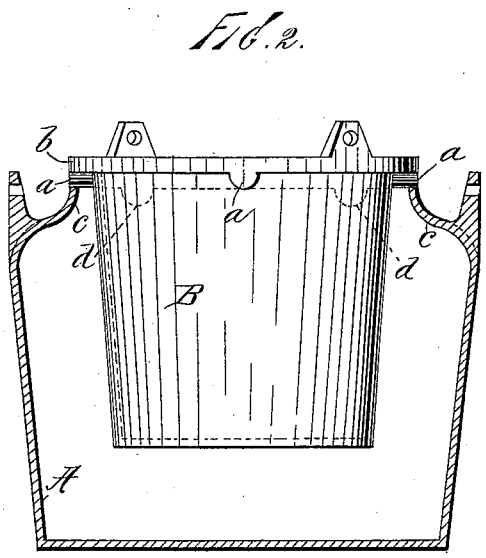
Figure 3:
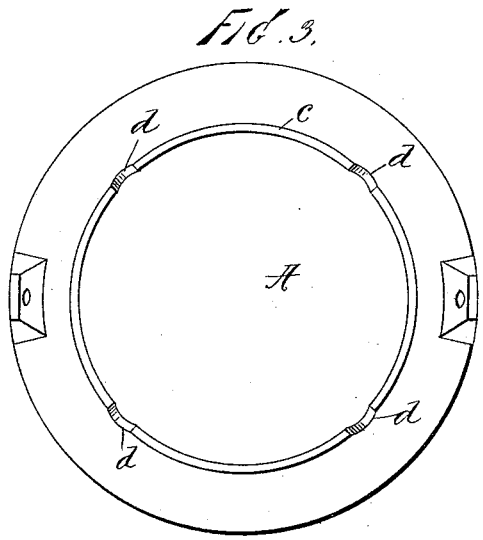
Figure 4:
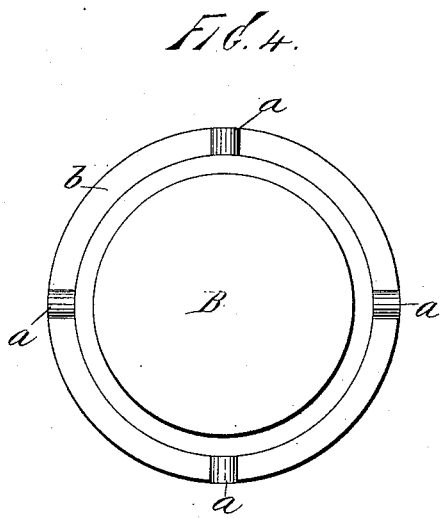

In the drawings, Figure 1 is an elevation of a glue-pot having my improvements applied thereto, the top of the outer vessel being closed; and Fig. 2 is a view of the same, partly in section and partly in elevation, showing the inner vessel sustained so as to permit free egress of steam. Fig. 3 is a plan showing the top of the outer vessel, and Fig. 4 a similar view showing the under side of the flange around the mouth of the inner vessel.

In all the figures like letters of reference wherever they occur indicate corresponding parts.

The glue-pot is selected for illustration of my improvement as being the article in which its advantages are most apparent, though it may be applied to other articles of a like general character.

A is the outer or water-containing vessel, which is subjected to the direct action of the fire or other source of heat, and B is the inner vessel, in the example shown the pot which is to contain the glue. This inner pot is heated solely by the steam or hot water within the outer vessel. When the contents of the inner pot boil over or are sufficiently heated, it is desirable to check further heating, at the same time leaving the apparatus in such condition that the heating may be resumed at any instant.

Upon the inner vessel B and beneath the flange $b$ thereof I supply lugs $a\ a$, and in the upper margin $c$ of the water-vessel A, I provide recesses or notches $d\ d$, calculated to receive and be closed by the lugs $a$. When the inner vessel is in place, as in Fig. 1, the mouth of the outer vessel is completely closed and the steam confined therein. When the contents of the inner vessel become sufficiently heated, it is only necessary to raise this vessel by its bail C, turn it slightly, and then lower it, so that the lugs rest upon the upper margin of the outer vessel, as in Fig. 2. Free escape for the steam is thus afforded through the opening all around the top, and then further heating is impossible. To resume the heating, the inner vessel has only to be reseated, as in Fig. 1. The lugs and recesses are regularly disposed, so that either lug may be brought around to any notch and all the others will register properly. Any number of the lugs may be employed, and instead of being placed on the inner vessel they might be placed on the outer one and the recesses on the inner with like results. The lugs and recesses are most advantageously supplied by casting them on or in the vessels. They are of depth or height such that while the opening afforded by their use will be sufficient for the free escape of steam, they will still permit the inner pot to project down into the water and to remain surrounded by water and steam, practically the same as when the pot is closed. This prevents cooling of the contents of the inner vessel, which is essential in glue-pots. The inner pot being low down in the outer one both when opened and when closed, it is not liable to be displaced or upset and may be dipped from with equal security in either condition.

The improved construction is found peculiarly advantageous in glue-pots, wherein immediate suspension of heating is so frequently necessary, (as will be readily appreciated.) It adds very little, if anything, to cost of manufacture over ordinary forms, and is well calculated to answer all the purposes or objects previously stated.

Having now fully described my invention, what I claim as new, and desire to secure by Letters Patent, is—

In a device of the character herein set forth, the outer vessel for containing water and the inner vessel arranged to close the mouth of the outer one and to contain the material to be heated, said vessels being provided with lugs $a\ a$ and corresponding notches $d\ d$, the parts being combined and arranged, as set forth, to provide for escape of steam without withdrawing the inner vessel from the water, for the objects explained.

In testimony that I claim the foregoing I have hereunto set my hand in the presence of two witnesses.

JAMES F. TAYLOR.

Witnesses:
JOHN BUCKLER,
WORTH OSGOOD.